United States Patent [19]

Jensen

[11] Patent Number: 4,720,001
[45] Date of Patent: Jan. 19, 1988

[54] FREE WHEELING HUB AND BRAKE FOR RACING KARTS

[76] Inventor: Michael E. Jensen, Rte. 1, Box 199H Sandy Dr., Shawano, Wis. 54166

[21] Appl. No.: 898,347

[22] Filed: Aug. 20, 1986

[51] Int. Cl.⁴ .................... F16D 67/02; F16D 15/00; F16D 41/00
[52] U.S. Cl. .................... 192/13 R; 180/54.1; 192/45; 192/50
[58] Field of Search ............. 192/50, 31, 38, 49, 192/45, 13 R; 180/76, 54.1, 908

[56] References Cited

U.S. PATENT DOCUMENTS

| 1,266,903 | 5/1918 | Bailey et al. | 192/50 |
| 1,930,454 | 10/1933 | Law | 192/50 X |
| 2,222,695 | 11/1940 | Velo | 192/50 X |
| 2,879,859 | 3/1959 | Swisher | 180/76 X |
| 3,194,368 | 7/1965 | Benson et al. | 192/45 |
| 3,232,369 | 2/1966 | Holloway | 192/50 X |
| 3,528,534 | 9/1970 | Benson | 192/45 |
| 3,563,352 | 2/1971 | Stibbe | 192/45 X |
| 4,170,369 | 10/1979 | Strutman | 192/45 X |

FOREIGN PATENT DOCUMENTS

| 140300 | 1/1935 | Austria | 192/50 |
| 461410 | 11/1926 | Fed. Rep. of Germany | 192/50 |
| 2017706 | 7/1979 | Fed. Rep. of Germany | 192/45 |
| 727917 | 4/1955 | United Kingdom | 192/45 |

Primary Examiner—Rodney H. Bonck

[57] ABSTRACT

A drive arrangement for self-propelled racing karts permitting free wheeling rotation of one drive wheel at a rotational speed exceeding that of the other drive wheel.

8 Claims, 4 Drawing Figures

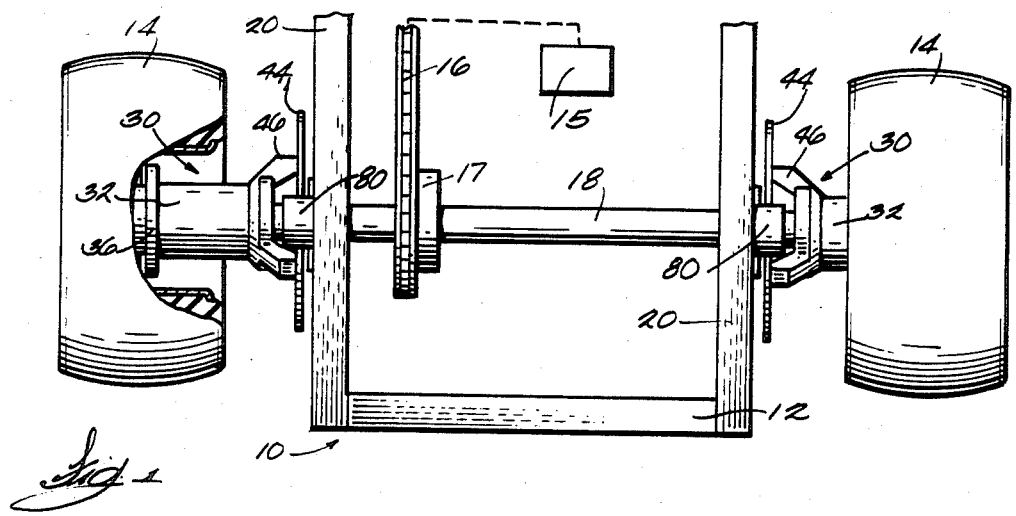
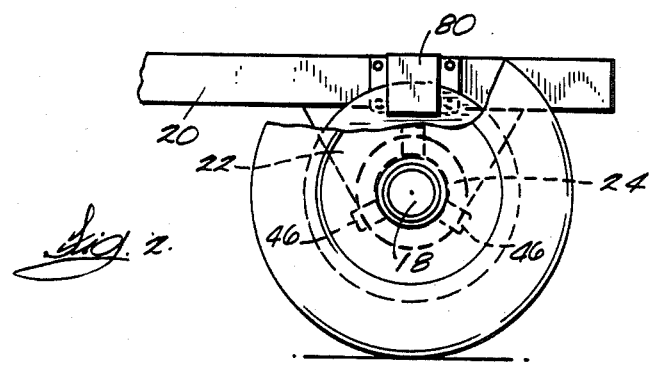
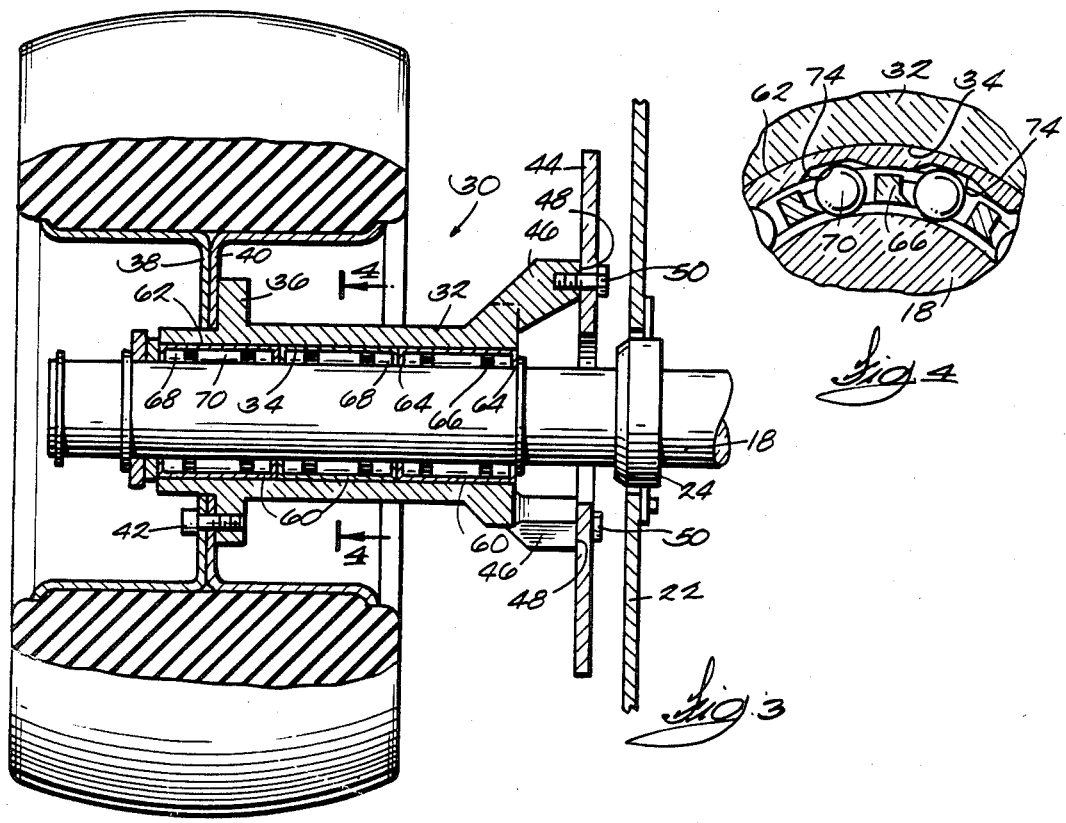

FREE WHEELING HUB AND BRAKE FOR RACING KARTS

FIELD OF THE INVENTION

The invention relates to motorized karts of the type used in racing and having a small, lightweight frame and chassis and a lightweight internal combustion engine.

RELATED APPLICATIONS

Attention is directed to applicant's co-pending application, Ser. No. 868,693 filed May 30, 1986.

BACKGROUND PRIOR ART

In the construction of small lightweight karts used in racing, the karts commonly include an internal combustion engine mounted rearwardly of a single seat and positioned over the rear axle of the kart. A pair of drive wheels are fixed to the opposite ends of the axle. The kart also includes a centrifugal clutch operably connecting the engine to the axle such that when the engine is operated at relatively high speeds, the engine is drivingly connected to the axle, and at lower speeds, the engine is disengaged from the axle.

The use of such karts is primarily in racing and on tracks having relatively tight corners. As the karts move around a tight corner, the outer rear drive wheel will travel through a greater radius than the drive wheel adjacent the inside of the curve. Since the outer rear wheel is fixed to the axle, it will rotate at the same speed as the inside wheel, and consequently the outer wheel will drag as it moves through the corner. This generates friction in the turns, slows the karts, and also tends to cause the wheels to wear. The frictional contact of the outside wheel with the pavement may also cause the wheel to bounce as it moves through the turn. This causes vibration in the kart and also reduces the operator's control over the kart in the turns.

SUMMARY OF THE INVENTION

The present invention provides a lightweight, uncomplicated apparatus for improving the performance of a racing kart and for reducing tire wear. More specifically, the invention provides hub assemblies for mounting the drive wheels, the hub assemblies functioning to permit one of the drive wheels to rotate at a speed greater than the other wheel but providing means for maintaining a positive driving connection between the engine and the slower of the two drive wheels. The hub assemblies each comprise a central hub having a central longitudinally extending bore housing at least one roller bearing clutch, and the roller bearing clutch, in turn, housing an end of the axle. The hub is supported on the end of the axle by the roller bearing clutch such that the hub is freely rotatable around the axle in one direction of rotation but is prevented from rotating in the opposite direction with respect to the axle. The hub includes a circumferentially extending flange adapted to permit a wheel to be mounted to the hub for rotation with the hub.

In a preferred embodiment of the invention the hub assembly also includes a brake disc which can be fixed to the hub for rotation therewith, and the hub is provided with flange means for permitting the brake disk to be fixed to the hub.

Various features and advantages of the invention will be apparent by reference to the following description of a preferred embodiment, from the drawings and from the claims.

BRIEF DESCRIPTION OF THE DRAWINGS

FIG. 1 is a partial plan view of a self-propelled kart embodying the invention.

FIG. 2 is a side elevation view taken along line 2—2 in FIG. 1.

FIG. 3 is an enlarged cross section view of a portion of the apparatus shown in FIG. 1.

FIG. 4 is a cross section view taken along line 4—4 in FIG. 3.

Before describing one embodiment of the invention in detail, it is to be understood that the invention is not limited in its application to the details of construction set forth in the following description or illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF A PREFERRED EMBODIMENT

Illustrated in FIG. 1 is a rear portion of a self-propelled racing kart 10 embodying the invention, the kart 10 including a lightweight frame 12 supported by wheels 14. The frame 12 is adapted to support an engine 15 (shown schematically in FIG. 1), and the engine is drivingly connected by a chain or belt 16 and a centrifugal clutch 17 to a rear axle 18 of the kart to drive the rear wheels 14 of the kart. The centrifugal clutch 17 is conventional and provides a driving connection between the engine and the axle 18 once the engine has reached a predetermined, relatively high, operating speed.

While various means could be provided for supporting the axle 18, in the illustrated arrangement the frame 12 includes a pair of frame members 20, and a pair of brackets 22 (FIG. 2) are supported by the frame members 20 and function to support bearings 24, the bearings 24 in turn supporting the opposite ends of the axle 18.

Means are also provided for mounting the drive wheels 14 on the opposite ends of the axle 18 such that the wheels 14 are normally driven by the axle 18, but wherein the drive wheels 14 can independently rotate at speeds greater than the speed of the axle 18. In the illustrated arrangement the means for mounting the drive wheels 14 comprise a pair of hub assemblies 30, each hub assembly 30 including a hub 32 having a central longitudinally extending bore 34 adapted to house an end of the axle 18. In the illustrated arrangement, each hub 32 includes a circular flange 36 at its outer end adapted to support a wheel 14. More specifically, in the illustrated arrangement, each wheel includes a pair of flanges 38 and 40 which are bolted together. The wheel 14 is secured to the circular flange 36 by bolts 42 spaced circumferentially around the flange 36.

The hub assembly 30 further includes a brake disc 44, and the hub 32 is constructed to include means for rigidly securing the brake disc 44 to the hub 32 for rotation with the hub. In the particular arrangement illustrated, the end of the hub 32 opposite that supporting the flange 36 is provided with a plurality of generally radially extending fingers 46 each having an end defining a planar surface 48. The brake disc 44 is positioned against the planar surfaces 48 of the fingers 46, and bolts 50 extend through the brake disc 44 into threaded bores in the fingers 46 to secure the brake disc rigidly to the hub for rotation with the hub.

The hub assembly 30 further includes means for supporting the hub 32 and the wheel 14 on the end of the axle 18 such that the wheel 14 is freely rotatable on the axle in a first direction of rotation with respect to the axle 18 and such that the axle can drive the wheel in that rotational direction. The means for supporting the hub and the wheel includes at least one roller bearing clutch. In the illustrated arrangement the central bore 34 of the hub 32 houses three (3) roller bearing clutches 60 in side-by-side stacked relationship, the roller bearing clutches being press fit into the bore 34 and each of the roller bearing clutches 60 being intended to support a portion of the load of the axle. While the roller bearing clutches 60 could have other constructions, in the illustrated arrangement the roller bearing clutches can comprise conventional Model FCB-30 roller bearing clutches produced by the Torrington Company, Torrington, Conn., or Model HFL 3030 clutches produced by INA Walzlager Schaeffler KG, West Germany.

While the roller bearing clutches 60 are conventional and will not be described in detail, each roller bearing clutch 60 includes a cylindrical bearing housing 62 having an inwardly extending lip or flange 64 at each end of the bearing housing. A bearing cage 66 is contained in the bearing housing 62 and is held in place by the inwardly extending flanges 64. A plurality of roller bearings 68 are supported by the bearing cage 66, and the roller bearings 68 in turn support the ends of the axle housed in the bearings. Thus, the outer surface of the axle 18 provides a bearing race surface for the roller bearings 68. In a preferred form of the invention, at least the end of the axle 18 housed in the bearing clutch 60 is hardened to a minimum of Rockwell 58 C scale so as to prevent wear of the axle and to permit use of the axle as a bearing race surface. The bearing cages 66 of each roller bearing clutch 60 also support a plurality of clutch members 70 spaced circumferentially around the interior of the bearing housing 62. As best illustrated in FIG. 4 the inner surface of the housing 62 is also provided with a plurality of recesses 74, each recess housing a portion of one of the clutch members 70. The recesses 74 include a contoured ramp surface. In the event that the axle 18 rotates in a counterclockwise direction as seen in FIG. 4 with respect to the housing 62 and the hub 32 about the longitudinal axis of the axle, the wheel and hub can overrun the axle. However, in the event that the axle 18 rotates in a clockwise direction with respect to the hub 32 as seen in FIG. 4, the cam members 70 will become wedged between the ramp surfaces of the contoured recesses 74 and the axle to prevent relative rotation of the axle 18 and the hub 32, and the axle 18 will drive the hub 32 and the wheel.

In operation of the kart 10, the roller bearing clutches 60 permit free rotation of the wheels about the axles if the wheels are driven at a speed faster than the axle and in a rotational direction of forward movement of the kart. Unless the wheels overrun the axle, however, the axle will drive the hubs through the roller bearing clutches since the roller bearing clutches prevent the axle from being driven at a speed greater than the speed of the wheels.

In the illustrated arrangement the kart also includes brake calipers 80 supported by the brackets 22 and for selectively gripping and brake disks 44 to thereby brake the hubs and the drive wheels. The brake calipers 80 are conventional and their construction and operation will not be described in detail. In the illustrated arrangement, the brake calipers are conveniently supported by the brackets 22 and are positioned directly above the axle 14. Preferably, the calipers 80 are mounted on the bracket 22 by the same bolts which mount the bearing 24 on the bracket 22.

Various features of the invention are set forth in the following claims.

I claim:

1. A hub assembly for use in a self propelled kart, the kart including a frame, a plurality of wheels for supporting the frame for movement along the ground, the plurality of wheels including a pair of drive wheels, an engine supported by the frame, an axle supported by the frame and including opposite ends, means for drivingly connecting the engine to the axle such that the axle is driven by the engine, the hub assembly comprising:
a one-piece hub adapted to be mounted on one of said opposite ends of said axle and for supporting one of said wheels on said one of said opposite ends of said axle, said hub including opposite ends, one end of the hub including means for supporting one of the drive wheels, said means for supporting one of the drive wheels including a flange surrounding one end of the hub, and the other of the ends of the hub including means for supporting a brake disk, and said hub including a central cylindrical bore, and
at least one roller bearing clutch means housed in said central cylindrical bore, said roller bearing clutch housing an end of said axle, and said roller bearing clutch means including means for providing a driving connection between said axle and said hub such that said axle can drive said hub in a first direction of rotation and means for supporting said hub for free rotation around said axle in said first direction of rotation when said wheel rotates in said first direction of rotation at a speed greater than the speed of rotation of said axle, said roller bearing clutch including a housing adapted to be housed in said central cylindrical bore of said hub for rotation with said central cylindrical bore of said hub, a bearing cage contained in said housing, a plurality of roller bearings supported by said bearing cage, said roller bearings being adapted to support said axle for rotation with respect to said hub, and a plurality of clutch members supported by said bearing cage and spaced circumferentially around said axle.

2. A hub assembly as set forth in claim 1 wherein said axle has an outer surface which provides a bearing race surface for said roller bearings, and wherein at least said end of said axle housed in said central cylindrical bore is hardened to a minimum of Rockwell 58 C scale so as to prevent wear of said end of said axle and to permit use of said outer surface of said axle as a bearing race surface.

3. A hub assembly as set forth in claim 1 and further including a brake disk mounted on said means for supporting a brake disc and for rotation with said hub.

4. A hub assembly as set forth in claim 3 wherein said means for supporting a brake disc includes a mounting surface perpendicular to the longitudinal axis of the hub and spaced outwardly from the longitudinal axis of the hub, said brake disk being secured to said mounting surface.

5. A self propelled kart, comprising:
a frame, a plurality of wheels for supporting the frame for movement along the ground, the plurality of wheels including a pair of drive wheels, an engine supported by the frame, an axle supported by the frame and including opposite ends, means for drivingly connecting the engine to the axle such that the axle is driven by the engine, and a hub assembly including a hub adapted to be mounted on one of said opposite ends of said axle and for supporting one of said wheels on said one of said opposite ends of said axle, said hub including opposite ends, one end of the hub including means for supporting one of the drive wheels, said means for supporting one of the drive wheels including a flange surrounding said one end of the hub, and the other of the ends of the hub including means for supporting a brake disk, and said hub including a central cylindrical bore, and at least one roller bearing clutch means housed in said central cylindrical bore, said roller bearing clutch housing an end of said axle, and said roller bearing clutch means including means for providing a driving connection between said axle and said hub such that said axle can drive said hub in said first direction of rotation and means for supporting said hub for free rotation around said axle in said first direction of rotation when said wheel rotates in said first direction of rotation at a speed greater than the speed of rotation of said axle, said roller bearing clutch including a housing adapted to be housed in said central cylindrical bore of said hub for rotation with said central cylindrical bore of said hub, a bearing cage contained in said housing, a plurality of roller bearings supported by said bearing cage, said roller bearings being adapted to support said axle for rotation with respect to said hub, and a plurality of clutch members supported by said bearing cage and spaced circumferentially around said axle.

6. A self propelled kart as set forth in claim 5 wherein said axle has an outer surface which provides a bearing race surface for said roller bearings, and wherein at least said end of said axle housed in said central cylindrical bore is hardened to a minimum of Rockwell 58 C scale so as to prevent wear of said end of said axle and to permit use of said outer surface of said axle as a bearing race surface.

7. A self propelled kart as set forth in claim 5 and further including a brake disk mounted on said means for supporting a brake disc and for rotation with said hub.

8. A self propelled kart as set forth in claim 7 wherein said means for supporting a brake disc includes a mounting surface perpendicular to the longitudinal axis of the hub and spaced outwardly from the longitudinal axis of the hub, said brake disk being secured to said mounting surface.

* * * * *